US008189217B2

(12) United States Patent
Ohba

(10) Patent No.: US 8,189,217 B2
(45) Date of Patent: May 29, 2012

(54) IMAGE PROCESSING SYSTEM CONFIGURED TO SET A USER AUTHORITY LEVEL

(75) Inventor: Shin Ohba, Toyokawa (JP)

(73) Assignee: Konica Minolta Business Technologies, Inc., Tokyo (JP)

(*) Notice: Subject to any disclaimer, the term of this patent is extended or adjusted under 35 U.S.C. 154(b) by 214 days.

(21) Appl. No.: 12/698,642

(22) Filed: Feb. 2, 2010

(65) Prior Publication Data
US 2010/0195135 A1 Aug. 5, 2010

(30) Foreign Application Priority Data

Feb. 3, 2009 (JP) ................................. 2009-022971

(51) Int. Cl.
G06K 15/00 (2006.01)
G06F 3/12 (2006.01)
(52) U.S. Cl. ........ 358/1.14; 358/1.1; 358/1.15; 358/1.16
(58) Field of Classification Search .................. None
See application file for complete search history.

(56) References Cited

U.S. PATENT DOCUMENTS

| 6,089,765 | A | 7/2000 | Mori |
| 6,862,583 | B1* | 3/2005 | Mazzagatte et al. ............ 705/64 |
| 2005/0243363 | A1 | 11/2005 | Muto |
| 2005/0278528 | A1* | 12/2005 | Kathan .......................... 713/168 |
| 2008/0239389 | A1 | 10/2008 | Kudo |
| 2009/0228962 | A1* | 9/2009 | Pathak .............................. 726/5 |
| 2011/0164271 | A1* | 7/2011 | Kamimura ................... 358/1.14 |

FOREIGN PATENT DOCUMENTS

| JP | 11-105381 | 4/1999 |
| JP | 11-196206 | 7/1999 |
| JP | 11-239238 | 8/1999 |
| JP | 2002-373064 | 12/2002 |
| JP | 2004-343780 | 12/2004 |
| JP | 2005-216188 | 8/2005 |
| JP | 2005-339508 | 12/2005 |
| JP | 2006-163982 | 6/2006 |
| JP | 2007-316752 | 12/2007 |
| JP | 2008-250524 | 10/2008 |

OTHER PUBLICATIONS

Japanese Notification of Reasons for Refusal mailed Jan. 18, 2011, directed to counterpart Japanese Application No. 2009-022971; 7 pages.

* cited by examiner

Primary Examiner — Vincent Rudolph
(74) Attorney, Agent, or Firm — Morrison & Foerster LLP

(57) ABSTRACT

An information processing apparatus transmits a job, share user information indicating users who are permitted to access a shared folder, and access permission information defining the users' user authority level to use data stored in the shared folder, which is set for the shared folder, collectively to an image processing apparatus. Receiving these information pieces, the image processing apparatus generates job access authority information defining the users' authority level to use the received job, based on the access permission information, and records the job, the share user information and the generated job access authority information in a memory, with their connections.

24 Claims, 11 Drawing Sheets

G1

FAX Destination Information

| Destination | 0123-45-6789 |
|---|---|

User Information

| User Name | User A |
|---|---|
| Password | **** |

Storage Location Information

| Computer Name | Client 5 |
|---|---|
| File Path | Shared Folder A\Folder A\Job A |

B2 — Destination row
B3 — User Name row
B4 — Password row
B5 — Computer Name row
B6 — File Path row
B1 — OK
B0 — Cancel

FIG.6

Access Authority Conversion Information     T1

| Access Permission Information | Job Access Authority Information |
|---|---|
| Full-control | View, edit, delete and reuse |
| Change | View and edit |
| Read out | View |

FIG.8

IMAGE PROCESSING SYSTEM CONFIGURED TO SET A USER AUTHORITY LEVEL

This application claims priority under 35 U.S.C. §119 to Japanese Patent Application No. 2009-022971 filed on Feb. 3, 2009, the entire disclosure of which is incorporated herein by reference in its entirety.

BACKGROUND OF THE INVENTION

1. Field of the Invention

The present invention relates to an image processing system including an image processing apparatus and an information processing apparatus interconnected via a network, an image processing method implemented by this image processing system, an image processing apparatus and an information processing apparatus preferably employed in this image processing system, and image processing programs recorded in computer readable recording mediums to make computers execute processing.

2. Description of the Related Art

The following description sets forth the inventor's knowledge of related art and problems therein and should not be construed as an admission of knowledge in the prior art.

In addition to the function of printing according to a print job or a facsimile job immediately when receiving it from an information processing apparatus such as a personal computer, image processing apparatuses of recent years have the function of recording such a job temporarily in a recording medium such as a hard disk drive when receiving it, and outputting the job at a user's desirable timing.

Meanwhile, an information processing apparatus having data in a shared folder that can be jointly owned by a plurality of users, sometimes sets for the shared folder, the users' user authority level to use the data stored in the shared folder. For example, it may be a shared folder that permits the users to change the data stored therein, a shared folder that permits the users only to read out the data, or a shared folder that permits the users to perform any operations (full control). In other words, the users who jointly own the shared folder are permitted to use the data stored therein at a user authority level that is set in advance for the shared folder.

However, when an administrator or another person of a shared folder with a certain user authority level, stored in the information processing apparatus, specifies a data piece among those stored in the shared folder and gives a job to an image processing apparatus to record it in a memory of the image processing apparatus, there have been the following problems, conventionally.

That is, the user authority level of users who jointly own the shared folder stored in the information processing apparatus is not continuously effective for the job given to the image processing apparatus. Thus, if the user who gave the job to the image processing apparatus hopes to set for the job, a user authority level that is the same as the one set in advance for the shared folder stored in the information processing apparatus, he/she has to do it manually or in another manner by operating the image processing apparatus. This is extremely troublesome.

On the other hand, some of the image processing apparatuses have the function of classifying data pieces received from information processing apparatuses, by user or group, in segmented memory areas referred to as 'Boxes'. And it is certainly possible by using the Box function, that a user authority level that is the same as the one set in advance for the shared folder stored in the information processing apparatus, is given to the users who jointly own the shared folder, by creating a group Box that permits use of only users who affiliate a certain group, for example.

As for a technology related to the Box function, according to Japanese Unexamined Laid-open Patent Publication No. H11-196206, there is a facsimile apparatus that implements a process to sort out received facsimile information pieces. This facsimile apparatus sorts out received facsimile information pieces into Boxes that are memory areas assigned to respective destinations extracted from the facsimile information pieces.

Furthermore, as disclosed in Japanese Unexamined Laid-open Patent Publication No. H11-239238, a facsimile apparatus stores a confidential document into a personal Box that is a memory area assigned to a recipient user of the document and registers the storage location of the confidential document in a Web server of the facsimile apparatus, when receives the confidential document. After that, the facsimile apparatus transmits to the recipient user, a message notifying of the receipt of the confidential document by e-mail. And the facsimile apparatus provides a linked location representing the confidential document when the recipient user who received the message accesses the facsimile apparatus with an ID and a password by operating a personal computer, and he/she is permitted to access the confidential document according to the linked location.

However, if a user hopes to create a group Box and other Boxes by using the Box function described above, he/she still has to complete necessary operations all manually. This is still troublesome.

Furthermore, if data pieces to be processed by a plurality of jobs are stored in different shared folders, a user has to create a group Box for each of the shared folders. This is also troublesome.

The technologies in the publications cited above do not provide a perfect solution to resolve these problems.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The Preferred embodiments of the present invention can significantly improve upon existing methods and/or apparatuses.

It is an objective of the present invention to provide an image processing system capable of setting for a job, a user authority level that is the same as the one set in advance for a shared folder stored in an information processing apparatus and jointly owned by users, automatically by an image processing apparatus, when a data piece stored in the shared folder is specified and the job is given to the image processing apparatus.

It is another objective of the present invention to provide an image processing method implemented by the above-mentioned image processing system.

It is yet another objective of the present invention to provide an image processing apparatus preferably employed in the above-mentioned image processing system.

It is still yet another objective of the present invention to provide an information processing apparatus preferably employed in the above-mentioned image processing system.

It is further still yet another objective of the present invention to provide an image processing program to make a computer of the image processing apparatus execute processing by the image processing method.

It is further still yet another objective of the present invention to provide an image processing program to make a computer of the information processing apparatus execute processing by the image processing method.

According to a first aspect of the present invention, an image processing system includes an image processing apparatus and an information processing apparatus interconnected via a network, and wherein:

the information processing apparatus includes:
- a memory that holds in itself, one or more than one shared folder each storing one or more than one data pieces;
- an accepter that accepts a user's specification of a data piece to be processed by a job among those stored in the shared folders and a user's request of the job to be executed on the specified data piece; and
- a transmitter that transmits the job to be executed on the specified data piece, share user information indicating users who are permitted to access the shared folder storing the specified data piece, and access permission information defining the users' user authority level to use the data piece, which is set for the shared folder, collectively to the image processing apparatus, and the image processing apparatus includes:
- a receiver that receives the job, the share user information and the access permission information;
- a job access authority information generator that generates job access authority information defining the users' user authority level to use the job received by the receiver, based on the access permission information received together with the job; and
- a memory that records in itself, the job and the share user information received by the receiver and the job access authority information generated by the job access authority information generator, with their connections.

According to a second aspect of the present invention, an image processing method implemented by an image processing system in which an image processing apparatus and an information processing apparatus holding one or more than one shared folders each that stores one or more than one data pieces, are interconnected via a network, includes:

the information processing apparatus's:
- accepting a user's specification of a data piece to be processed by a job among those stored in the shared folders and a user's request of the job to be executed on the specified data piece; and
- transmitting the job to be executed on the specified data piece, share user information indicating users who are permitted to access the shared folder storing the specified data piece, and access permission information defining the users' user authority level to use the data piece, which is set for the shared folder, collectively to the image processing apparatus, and and the image processing apparatus's:
- receiving the job, the share user information and the access permission information; generating job access authority information defining the users' user authority level to use the job, based on the access permission information received together with the job; and
- recording in a memory, the received job and share user information and the generated job access authority information, with their connections.

According to a third aspect of the present invention, an image processing apparatus includes:
- a receiver that receives via a network, collectively from an information processing apparatus holding one or more than one shared folders each that stores one or more than one data pieces, a job, share user information indicating users who are permitted to access the shared folder storing a data piece to be processed by the job, and access permission information defining the users' user authority level to use the data piece, which is set for the shared folder;
- a job access authority information generator that generates job access authority information defining the users' user authority level to use the job received by the receiver, based on the access permission information received together with the job; and
- a memory that records in itself, the job and the share user information received by the receiver and the job access authority information generated by the job access authority information generator, with their connections.

According to a fourth aspect of the present invention, an image processing program is recorded in a computer readable recording medium to make a computer of an image processing apparatus execute:
- receiving via a network, collectively from an information processing apparatus holding one or more than one shared folders each that stores one or more than one data pieces, a job, share user information indicating users who are permitted to access the shared folder storing a data piece to be processed by the job, and access permission information defining the users' user authority level to use the data piece, which is set for the shared folder;
- generating job access authority information defining the users' user authority level to use the job, based on the access permission information received together with the job; and
- recording in a memory, the received job and share user information, and the generated job access authority information, with their connections.

According to a fifth aspect of the present invention, an information processing apparatus includes:
- a memory that holds in itself, one or more than one shared folders each storing one or more than one data pieces;
- an accepter that accepts a user's specification of a data piece to be processed by a job among those stored in the shared folders and a user's request of the job to be executed on the specified data piece; and
- a transmitter that transmits the job to be executed on the specified data piece, share user information indicating users who are permitted to access the shared folder storing the specified data piece, and access permission information defining the users' user authority level to use the data piece, which is set for the shared folder, collectively to an image processing apparatus, via a network.

According to a sixth aspect of the present invention, an image processing program is recorded in a computer readable recording medium to make a computer of an information processing apparatus having one or more than one shared folders each that stores one or more than one data pieces, execute:

accepting a user's specification of a data piece to be processed by a job among those stored in the shared folders and a user's request of the job to be executed on the specified data piece; and transmitting the job to be executed on the specified data piece, share user information indicating users who are permitted to access the shared folder storing the specified data piece, and access permission information defining the users' user authority level to use the data piece, which is set for the shared folder, collectively to an image processing apparatus, via a network.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which:

FIG. 6 is a view showing an example of a PC-FAX transmission job setting screen;

FIG. 8 is a view showing an example of access authority conversion information;

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Some of the following embodiments of the present invention to be explained hereinafter include portions in common and the same codes are given to such portions in order to prevent repetition of explanation.

[First Embodiment]

Figure 1:
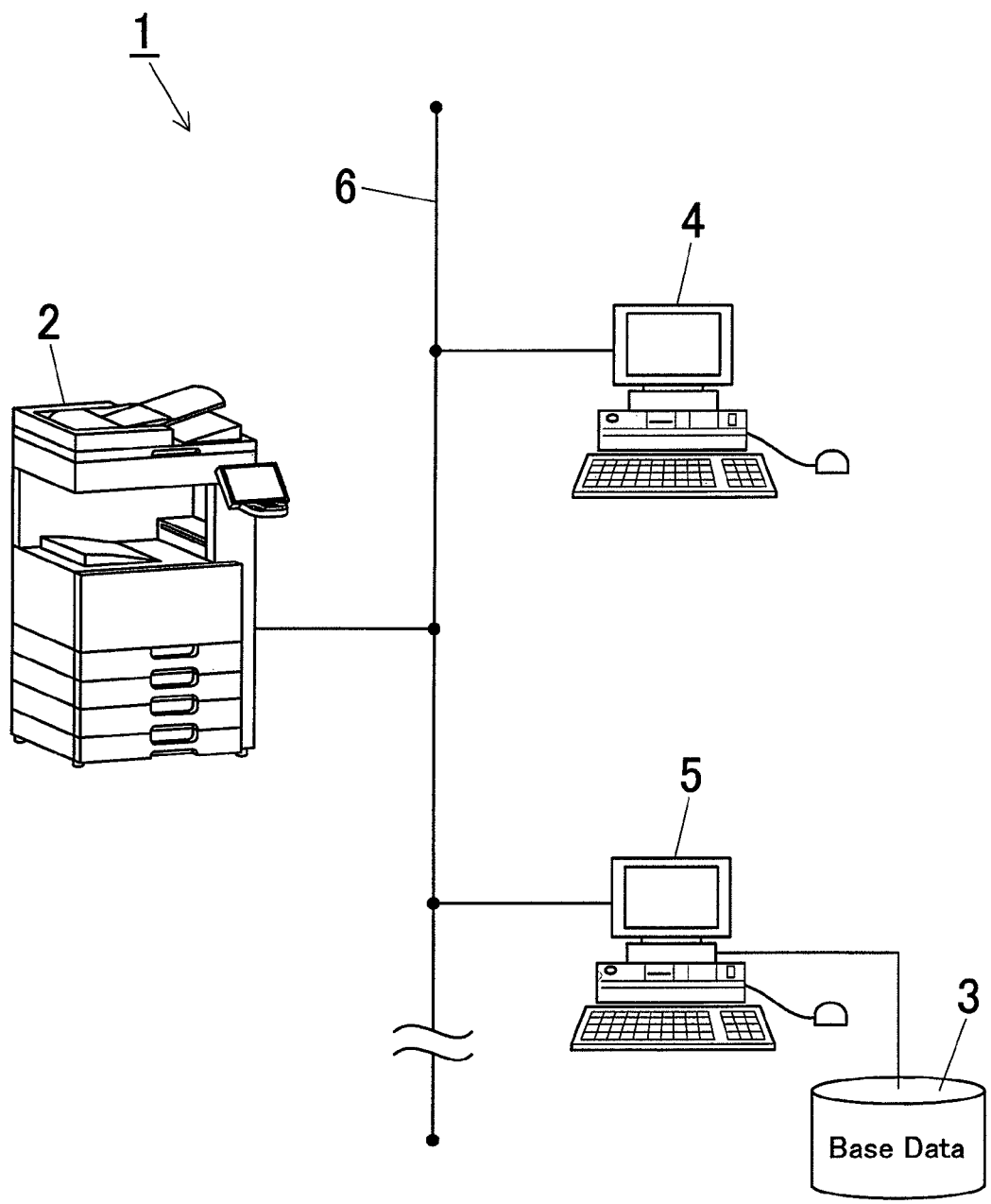
FIG. 1 is a view schematically showing an entire configuration of an image processing system according to one embodiment of the present invention.

FIG. 1 is a view schematically showing an entire configuration of an image processing system 1 according to one embodiment of the present invention.

This image processing system 1 includes an image processing apparatus 2 that is called as 'multifunctional machine', 'MFP (Multi Function Peripheral)' or etc., and client computers (hereinafter will be simply referred to as 'clients') 4 and 5 such as personal computers. And these are configured so as to access each other via a network 6 such as a wired or wireless LAN and exchange data with each other.

The clients 4 and 5 correspond to information processing apparatuses connected to the network 6, and these are used by different users.

Figure 2:
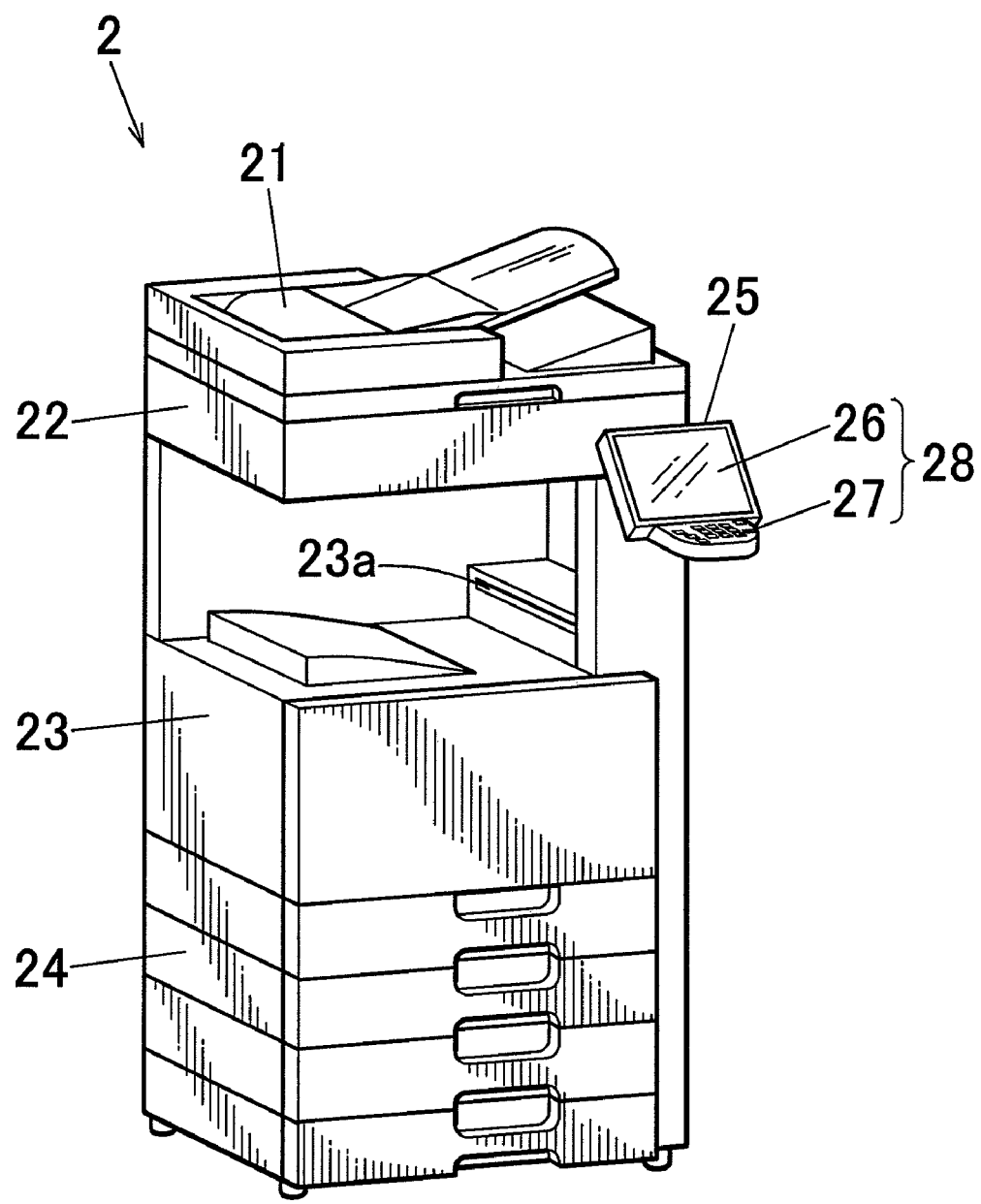
FIG. 2 is a view externally showing an example of an image processing apparatus employed in the image processing system of FIG. 1.

FIG. 2 is a view externally showing an example of the image processing apparatus 2. In this embodiment, the image processing apparatus 2 is for example a multifunctional machine, a MFP or etc. collectively having the copying, network printing, scanning and facsimile (FAX) functions and other functions, as described above. However, the image processing apparatus 2 is not limited thereto, and alternatively may be an apparatus having only the network printing function, for example.

As shown in FIG. 2, this image processing apparatus 2 has a document conveyer 21 and a scanner 22 on the top thereof. In this configuration, the document conveyer 21 conveys sheets of a document one by one automatically to the scanner 22 that is a reader, and thus the scanner 22 optically reads characters, symbols and images recorded on the document.

There is a printer 23 under the scanner 22, and there is a sheet feeder 24 providing sheets to the printer 23, under the printer 23. In this configuration, the printer 23 activates its function, forming an image on a sheet provided by the sheet feeder 24 and outputting the printed sheet from an outlet 23a, when a job related to copying, network printing or FAX is executed.

The image processing apparatus 2 has a display 25 that displays job information and other information for users, such as a liquid crystal display, in the front side thereof; a touch panel 26 on the front surface of the display 25; and an operation portion 28 constructed of a plurality of operation buttons 27 provided near the display 25.

Figure 3:
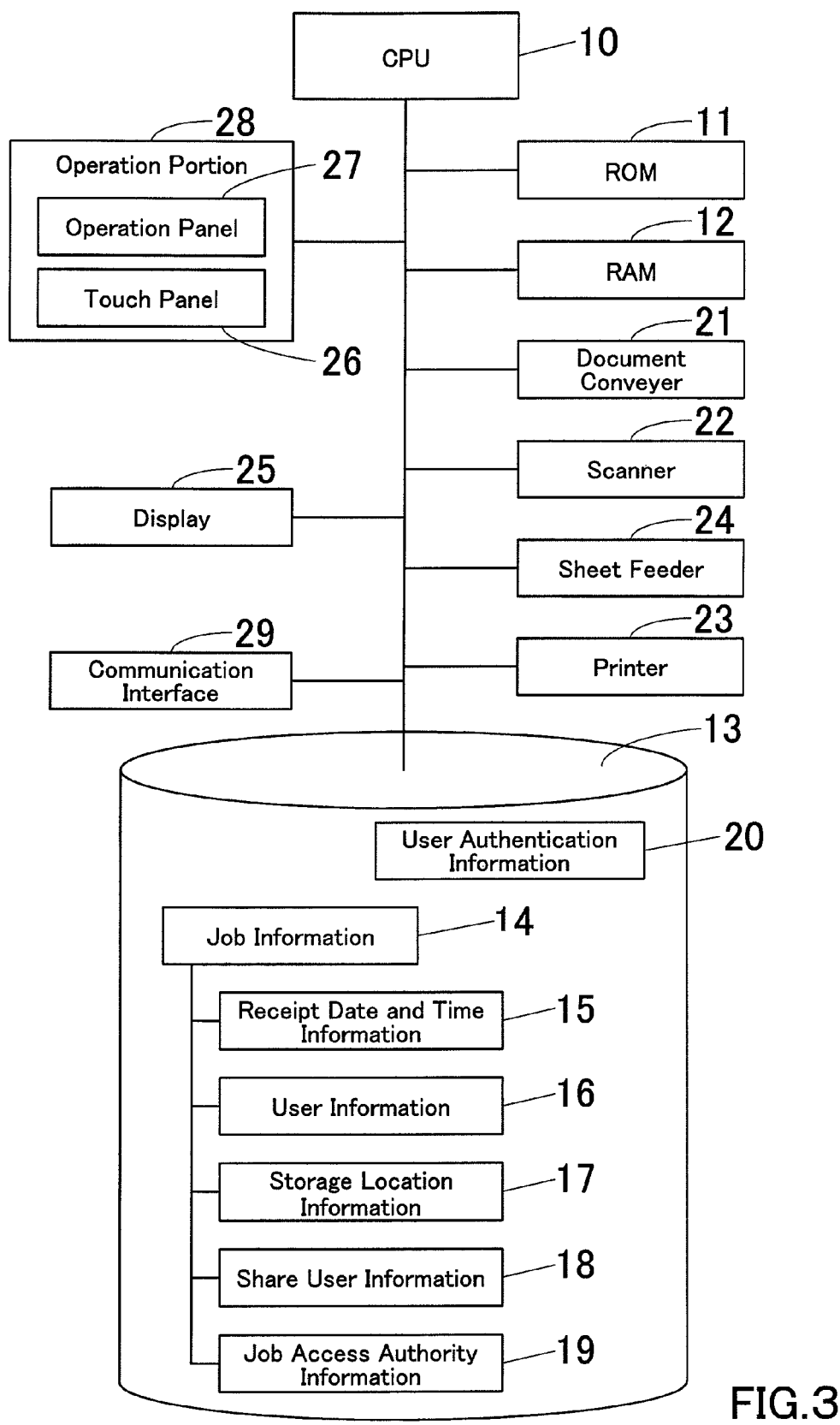
FIG. 3 is a view showing an example of a hardware configuration of the image processing apparatus.

FIG. 3 is a view showing an example of a hardware configuration of the image processing apparatus 2. In addition to the above-described configuration, the image processing apparatus 2 includes a CPU 11, a ROM 11, a RAM 12, a memory 13 and a communication interface 29.

By reading out and executing a program stored in the ROM 11, the CPU 10 activates the image processing apparatus 2's basic functions (the copying, network printing, scanning and FAX functions and other functions), and the various functions to be described hereinafter.

The memory 13 is a hard disk drive or etc. that records in itself job information 14, user authentication information 20 and other information.

The job information 14 relates to a job received by the image processing apparatus 2, and includes receipt date and time information 15, user information 16, storage location information 17, share user information 18 and job access authority information 19, as well as data (a file) to be processed by the job, a name of the data, conditions for job execution and other information.

The receipt date and time information 15 relates to a date and time when the image processing apparatus 2 receives a job. It is generated when a job is received via the network 6.

The user information 16 is received together with a job via the network 6, by the image processing apparatus 2, and it indicates the user who issued the job. In this embodiment, the user information 16 includes login information (user ID and password) to log in the client 5, for example.

The storage location information 17 indicates a storage location of a shared folder, received together with a job via the network 6, by the image processing apparatus 2, and also a storage location of base data specified by user to be processed by the job (for example, electronic data of a document, an image or etc. to be printed). In this embodiment, the storage location information 17 includes an address and a name of the client 5, and information (a file path) representing a shared folder in a hard disk drive 3, storing the base data.

The share user information 18 indicates users (share users) who are permitted to access a shared folder, and it is extracted from access authority information set for the shared folder, received together with a job via the network 6, by the image processing apparatus 2. For example, if a user using the client 4 is permitted to access base data stored in the client 5 via the network 6, the share user information 18 includes user information of the client 4.

The job access authority information 19 defines a user authority level to use a job. When the image processing apparatus 2 receives a job via the network 6, this job access authority information 19 is generated based on access permission information received together with the job. This access permission information defines a user authority level to use base data in a shared folder, which is applied to users who jointly own the shared folder and set for the shared folder. For example, if the users are permitted to read out a job, change a job or full control according to the access permission information, the job access authority information 19 is generated to apply to the job, a user authority level that is the same as the one defined by the access permission information.

The user authentication information 20 serves to limit users' use of the image processing apparatus 2. It includes for example, user IDs, passwords and other information of users who are permitted to use the image processing apparatus 2.

The communication interface 29 functions as a communicator to exchange data with information processing apparatuses such as the clients 4 and 6 via the network 6, or perform FAX communications with external devices via a telephone circuit. For example, a NIC (Network Interface Card), a modem, a TA (Terminal Adapter), a wireless interface or etc. is employed as the communication interface 29.

A program recorded in the ROM 11 can be updated to latest version by downloading it from an external device via the network 6 or etc.

Figure 4:
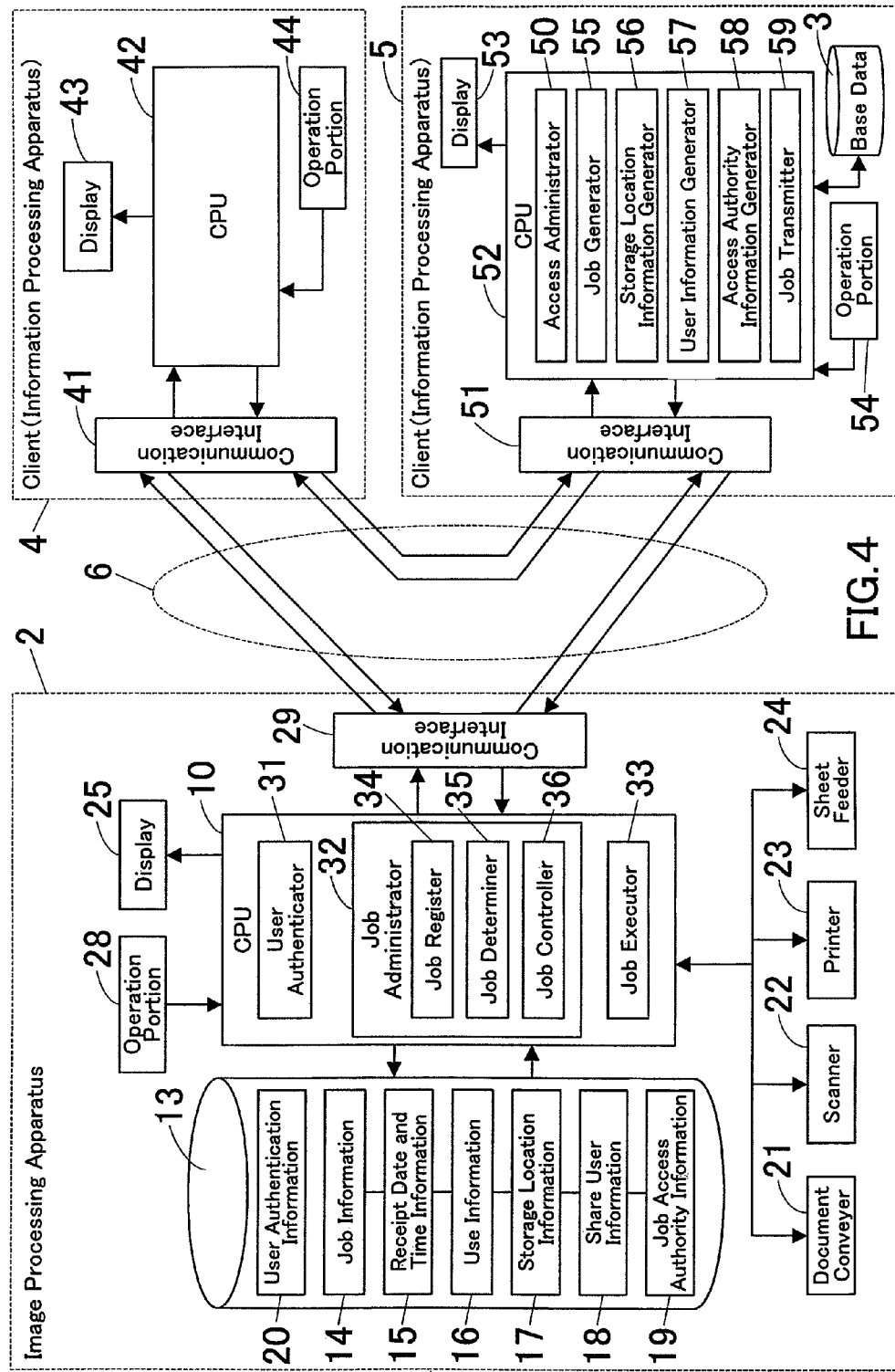
FIG. 4 is a block diagram showing a functional configuration of the image processing system.

FIG. 4 is a block diagram showing a functional configuration of the image processing system 1 according to one embodiment of the present invention. By executing the above-mentioned program, the CPU 10 of the image processing apparatus 2 functions as a user authenticator 31, a job administrator 32 and a job executor 33.

The user authenticator 31 performs authentication of users who try to use the image processing apparatus 2.

The job administrator 32 registers jobs received via the network 6 by recording the job information 14 of the jobs and extracts a target job from the job information 14 to make it executed. This job administrator 32 includes a job register 34, a job controller 36 and a job determiner 35.

The job register 34 registers a received job by recording the job information 14 of the job in the memory 13.

The job controller 36 extracts the share user information 18 and access permission information from access authority information received together with the job, converts the access permission information into the job access authority information 19 based on access authority conversion information to be described later, and performs other operations.

The job determiner 35 determines a job that is selected by a user among a plurality of jobs recorded in the memory 13.

The job executor 33 executes a job by driving the document conveyer 21, the scanner 22, the printer 23 or the sheet feeder 24, as instructed by the job controller 36.

Meanwhile, the client 4 includes a communication interface 41, a CPU 42 and a display 43 as well as an operation portion 44. The communication interface 41 serves to exchange data with the client 5 and the image processing apparatus 2 via the network 6.

The CPU 42 activates various functions of a client, and it can access via the network 6, data (also referred to as 'files') stored in a shared folder of the client 5, according to an instruction given by the operation portion 44.

The client 5 includes a communication interface 51, a CPU 52 and an operation portion 54.

The communication interface 51 serves to exchange data with the client 4 and the image processing apparatus 2 via the network 6.

The CPU 52 activates various function of a client. Also, when a user gives a job execution instruction to the image processing apparatus 2, by operating the operation portion 54 including a keyboard, a mouse and etc., the CPU 52 functions as a job generator 55 that generates a job, a user information generator 57, a storage location information generator 56, an access authority information generator 58 and a job transmitter 59. Furthermore, when a user using the client 4 tries to access a file stored in the memory 3 such as a hard disk drive via the network 6, the CPU 52 functions as an access administrator 50 that examines his/her user authority level.

In the above-described configuration, a user using the client 5 specifies a file to be processed by a job, among one or more than one files stored in any of one or more than one shared folders of the memory 3.

For example, in the case where a facsimile transmission instructing job (hereinafter will be referred to as 'PC-FAX transmission job') to instruct the image processing apparatus 2 to transmit facsimile data to a certain destination is to be given to the image processing apparatus 2, when a user selects a file and gives a job execution instruction, a PC-FAX driver installed on the client 5 starts working to give a PC-FAX transmission job to the image processing apparatus 2 and the user information generator 57 activates its function, generating user information based on login information of the user who logged in the client 5. And the storage location information generator 26 activates its function, generating a path to a shared folder (address or folder path) in order to access base data stored therein, as storage location information.

Furthermore, the access authority information generator 58 activates its function, generating share user information indicating users who are permitted to access the shared folder and access permission information defining the users' user authority level to use base data stored in the shared folder, collectively as access authority information. The share user information and the access permission information are preliminarily set and recorded in the memory 3, by an administrator or another person, and the access administer 50 administers these information pieces.

Then, the job generator 55 activates its function, generating a PC-FAX transmission job to process the base data, and the job transmitter 59 activates its function, transmitting the job to the image processing apparatus 2.

At the same time, the user information generated by the user information generator 57, the storage location information generated by the storage location information generator 56, and the access authority information generated by the access authority information generator 59 are transmitted to the image processing apparatus 2, together with the job. The job, the user information, the storage location information and the access authority information are transmitted collectively as one set, for example, and thus the image processing apparatus 2 recognizes that these information pieces are connected.

Figure 5:
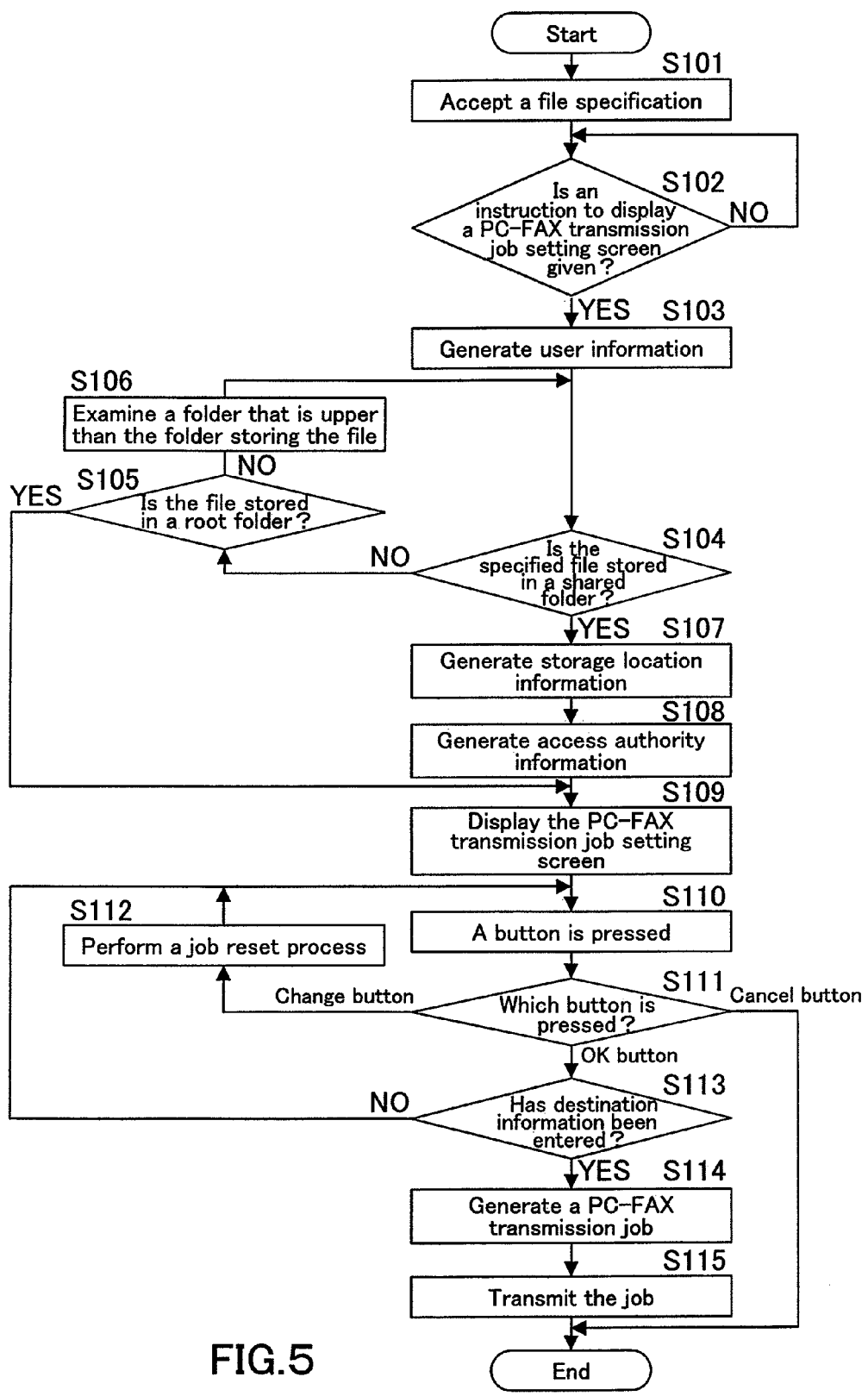
FIG. 5 is a flowchart representing a process routine executed in a client (information processing apparatus)

FIG. 5 is a flowchart representing a process routine executed in the client 5 of the image processing system 1. This process routine is executed by the CPU 52 according to a predetermined program recorded in a recording medium such as a ROM not shown in Figures.

For example, from a list of the files stored in the memory 3, displayed on the display 53 of the client 5, a user specifies a file to be processed by a PC-FAX transmission job by operating the operation portion 54. Then in Step S101, this operation is accepted and the specified file is opened.

In Step S102, it is judged whether or not an instruction to display a PC-FAX transmission job setting screen is given by the user. If an instruction to display a PC-FAX transmission job setting screen is given (YES in Step S102), user information is generated based on login information of the user who logged in the client 5, in Step S103.

Subsequently, it is judged in Step S104, whether or not the specified file is stored in a shared folder. If the file is stored in a shared folder (YES in Step S104), storage location information of the file is generated in Step S107.

Then, access authority information of the shared folder is generated in Step S108, and the user information and the storage location information are displayed in the PC-FAX transmission job setting screen, in Step S109.

FIG. 6 is a view showing an example of a PC-FAX transmission job setting screen G1 that is displayed on the display 53 of the client 5 in Step S109. In the PC-FAX transmission job setting screen G1, user information of the user who logged in the client 5 and storage location information of the data (file) specified by the user are displayed.

A destination setting button B2 is used to enter a destination of FAX transmission. A user name change button B3 is used to change a user name. A password change button B4 is used to change a password. A computer name change button B5 is used to change a computer name. A file path name change button B6 is used to change a file path name. Furthermore, there provided in the lower area of the setting screen G1, an OK button B1 and a cancel button B0 that can be operated by users. If the user presses the OK button B1, the PC-FAX transmission job is transmitted based on the job information changed by the user. Meanwhile, if the user presses the cancel button B0, the setting screen G1 is closed without transmission of the PC-FAX transmission job.

Back to FIG. 5, if the specified file is not stored in a shared folder (NO in Step S104), then it is judged in Step S105, whether or not the file is stored in a root folder. If the file is stored in a root folder (YES in Step S105), the process routine proceeds to Step S109 without generation of storage location information and access authority information, and wherein the PC-FAX transmission job setting screen G1 is displayed.

If the file is not stored in a root folder (NO in Step S105), a folder that is upper than the folder storing the file is examined in Step S106, then it is judged again in Step S104, whether or not the upper folder is a shared one. If the upper folder is a shared one (YES in Step S104), the processes Step S107 through S109 are performed as described above.

In Step S110, the client 5 waits until any button is pressed by the user, still displaying the PC-FAX transmission job setting screen on the display (as is in Step S109). In Step S111, it is judged which button is pressed.

If any of the change buttons B2 through B6 is pressed (change button in Step S111), the process routine proceeds to Step S112, and wherein a job reset process is performed. Then the process routine goes back to Step S110.

If the OK button B1 is pressed (OK button in Step S111), it is judged in Step S113, by the job generator 55, whether or not destination information has been entered in the job generator 55. If destination information has been entered (YES in Step S113), a PC-FAX transmission job is generated by the job generator 55 in Step S114.

Meanwhile in Step S113, if destination information has not been entered (NO in Step S113), the process routine waits until destination information is entered by the user (Step S110), still displaying the PC-FAX transmission job setting screen on the display.

And after that, in Step S115, the user information, the storage location information and the access authority information are transmitted to the image processing apparatus 2, together with the PC-FAX transmission job. Then the process routine terminates.

Meanwhile in Step S111, if the cancel button B0 is pressed via the PC-FAX transmission job setting screen G1 (cancel button in Step S111), the job generator 55 stops its function.

In this embodiment described above, a PC-FAX transmission job setting screen is displayed just for example. This embodiment is also applied to another case, for example where a PC-FAX transmission job is transmitted without the need of displaying a PC-FAX transmission job setting screen, when a file is dragged and dropped onto a printer icon of the image processing apparatus 2, and thus, user information, storage location information and access authority information are transmitted to the image processing apparatus 2, together with the job, just like in the way described above. Obviously, in this case, a user cannot change user information or a file path via the PC-FAX transmission job setting screen.

Meanwhile, when the image processing apparatus 2 receives the job via the network 6, the communication interface 29 activates its functions, generating the receipt date and time information 15. Then, it is judged whether or not it is a FAX receipt job to receive image data from a FAX apparatus, not a PC-FAX transmission job. If it is judged that it is not a FAX receipt job, but user information and access information of a shared folder are received together with the job, the user authenticator 31 activates its function, judging whether or not the user is permitted to register jobs, based on the user authentication information 20.

If the user is permitted to register jobs, the job register 34 activates its function, performing job registration by recording the PC-FAX transmission job, the receipt date and time information 15, the user information 16 and destination information of the job, in the memory 13, with their connections. If the storage location information 17 is also received together with the job, this storage location information 17 is recorded in the memory 13, with connection to the job.

Subsequently, the share user information 18 and access permission information are extracted from the access authority information received together with the job, and the access permission information is converted into the job access authority information 19 defining a user authority level to use the job, which is applied to users who jointly own the share folder, based on access authority conversion information registered in advance in the image processing apparatus 2. As described above, job access authority information is obtained easily by converting access permission information based on access authority conversion information, which will be detailed later.

The received job and share user information 18 and the job access authority information 19 obtained in this way above are stored in the memory 13, with their connections. As a result, there stored in the memory 13 with the connections, the job received via the network 6 and the receipt date and time information 15 of the job, and the user information 16, the storage location information 17 and the share user information 18 received together with the job, and the job access authority information 19.

When a user select one of a plurality of jobs recorded in the memory 13 to reuse, it is judged by the job controller 36 of the image processing apparatus 2, whether or not the user is permitted to access the selected job according to the share user information 18. If the user is included in those indicated by the share user information 18, he/she is permitted to access the job and use it at a user authority level defined by the job access authority information 19.

More concretely, if a user who selected a job is included in those indicated by the share user information 18, the user is permitted to use the job at a user authority level defined by the job access authority information 19. If a user who selected a job is not included those indicated by the share user information 18, the user is prohibited from accessing the job.

As described above, in this embodiment, a user authority level is given to a user who tries to use a job transmitted to the image processing apparatus 2, by utilizing access permission information that defines a user authority level of users who jointly own a shared folder of the client 5. Thus, a user authority level is given automatically, and users do not have to manually perform an operation to set a user authority level, an operation to create a Box that permits access from only users who jointly own the Box, and other troublesome operations any more.

Figure 7:
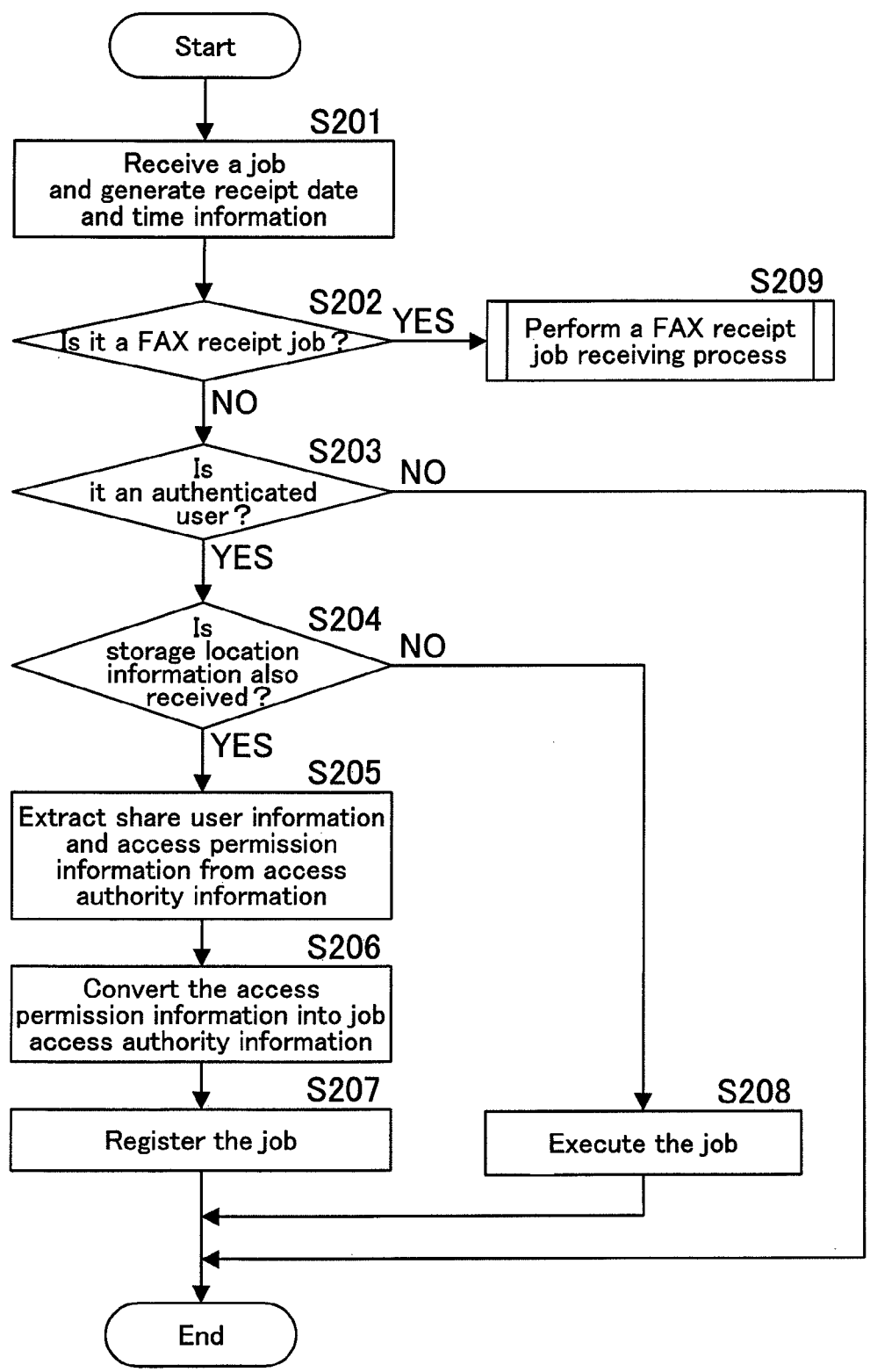
FIG. 7 is a flowchart showing representing a process routine executed in the image processing apparatus to register a received PC-FAX job.

FIG. 7 is a flowchart representing a process routine executed in the image processing apparatus 2 to perform processing on a received job as described above. This process routine is executed by the CPU 10 according to a program stored in a recording medium such as the ROM 11 or the memory 13.

In the embodiment to de described below, a job can be executed if the image processing apparatus 1 receives storage location information together with the job, and even if it doesn't receive storage location information together with the job.

In Step S201, when the image processing apparatus 2 receives a job via the network 6, the receipt date and time information 15 is generated. Then it is judged in Step S202, whether or not it is a FAX receipt job from a facsimile apparatus. If it is a FAX receipt job from a facsimile apparatus (YES in Step S202), a FAX receipt job receiving process is executed in Step S209. If it is not a FAX receipt job from a facsimile apparatus (NO in Step S202), then it is judged in Step S203, whether or not it is an authenticated, based on user information received together with the job.

If it is not an authenticated user (NO in Step S203), the process routine immediately terminates. If it is an authenticated user (YES in Step S203), then it is judged in Step S204, whether or not storage location information is received together with the job.

If storage location information is received (YES in Step S204), the share user information 18 and access permission information are extracted from access authority information received together with the job, in Step S205. And the extracted access permission information is converted into the job access authority information 19 based on access authority conversion information, in Step S206.

FIG. 8 is a view showing an example of access authority conversion information T1 that is used in Step S206 to obtain job access authority information. The access authority conversion information T1 serves to convert access permission information set for a shared folder, extracted from access authority information, into the job access authority information 19 set for an individual job. And a user is permitted by the job controller 36, to use the job at a user authority level defined by the job access authority information 19.

As shown in FIG. 8, in this embodiment, if the access permission information is 'full control', in other words, if full control of the base data stored in a shared folder, is given to users who jointly own the shared folder, the access permission information is converted to the job access authority information that permits 'view, edit, delete and reuse'. Thus, if a user who selected a job by operating the image processing apparatus 2 is included in those who jointly own the shared folder storing base data to be processed by the selected job, the user is permitted to view, edit, delete and reuse the job.

If the access permission information is 'change', it is converted into the job access authority information that permits 'view and edit'. Thus, if a user who selected a job by operating the image processing apparatus 2 is included in those who jointly own the shared folder storing base data to be processed by the selected job, the user is permitted to view and edit the job.

If the access permission information is 'readout', it is converted into the job access authority information that permits 'view'. Thus, even if a user who selected a job by operating the image processing apparatus 2 is included in those who jointly own the shared folder storing base data to be processed by the selected job, the user is permitted to view the job, only. Meanwhile, if a user who selected a job is not included in those who jointly own the shared folder storing base data to be processed by the selected job, the user is prohibited from doing anything with the job, even accessing the job.

Back to FIG. 7, in Step S207, the received job and the information pieces about the job: the receipt date and time information 15, the user information 16, the storage location information 17, the share user information 18, the job access authority information 19, destination information of the job information 14, the data to be processed by the job, and other information are recorded in the memory 13, with their connections. Thus, job registration is completed.

Meanwhile, if storage location information is not received together with the job (NO in Step S204), the received job is executed in Step S208.

By executing the processes above, the image processing apparatus 2 completes registration of a received job. As described above, in this embodiment, the job access authority information 19 obtained by converting access permission information set for a shared folder storing base data, is recorded in the memory 13. According to the job access authority information 19, the job controller 36 of the image processing apparatus 2 can set for a job selected by a user, a user authority level that is the same as the one set in advance for the shared folder of the client 5. And when the user tries to access the job stored in the image processing apparatus 2 by directly operating the image processing apparatus 2 or remotely operating via the client 4, his/her use of the job is controlled by the job controller 36, based on user information, the share user information 18 and the job access authority information 19, accordingly. As a result, the user is permitted to reuse the job at a suitable security level.

In the embodiment shown in FIG. 7, even if the image processing apparatus 2 receives access authority information together with a job but does not receive storage location information, the job is never registered. Alternatively, another embodiment may be employed, wherein as long as the image processing apparatus 2 receives access authority information together with a job, regardless of receipt of storage location information, share user information and access permission information are extracted from the access authority information, and the access permission information is converted into job access authority information, and then the job, the share user information, the job access authority information and other information are recorded with their connections.

Figure 9:
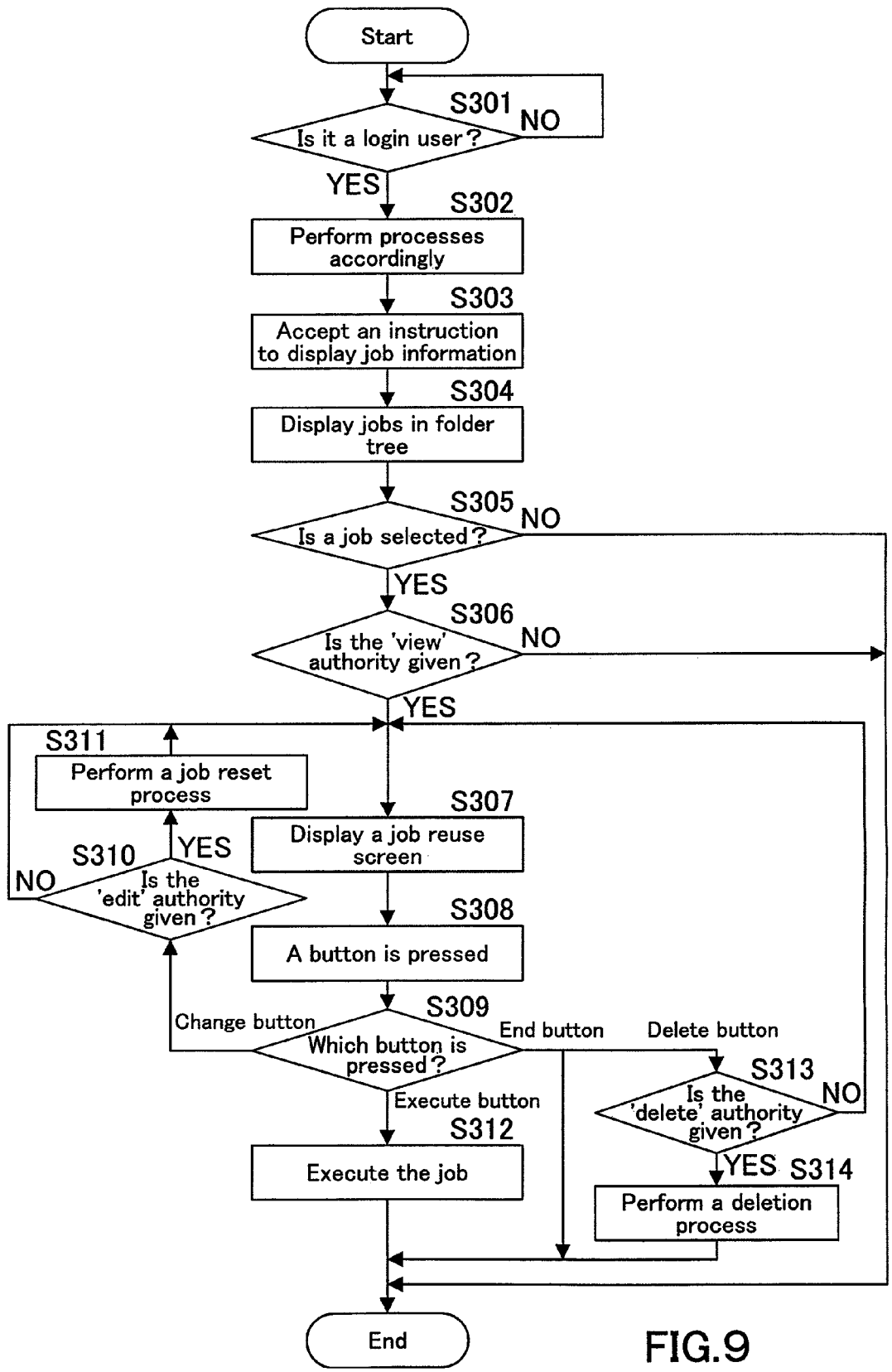
FIG. 9 is a flowchart representing a process routine executed in the image processing apparatus to reuse a job.

FIG. 9 is a flowchart representing a process routine executed in the image processing apparatus 2 to reuse a job. This process routine is also executed by the CPU 10 according to a program stored in a recording medium such as the ROM 11 or the memory 13.

Initially, a user performs an operation. Then in Step S301, it is judged by the user authenticator 31 of the image processing apparatus 2, whether or not it is a login user.

If authentication succeeds by the user's entering a user ID and a password (YES in Step S301), then in Step S302, various following operations are accepted and processes are performed accordingly. And when the user gives an instruction to display the job information 14 by operating the operation portion 28 of the image processing apparatus 2, this instruction is accepted in Step S303.

Subsequently, in the image processing apparatus 2, the receipt date and time information 15 and the storage location information 17 are obtained from the job information 14 recorded in the memory 13. And based on the share user information 16 recorded therein with connections to jobs, jobs connected to the user authenticated by the authenticator 31 are extracted among a plurality of jobs recorded in the memory 13. And then, in Step S304, the extracted jobs are displayed on the display 25, in folder tree according to the storage location information 17. At the same time, the receipt date and time information 15 of the jobs is also displayed.

Figures 10, 11:
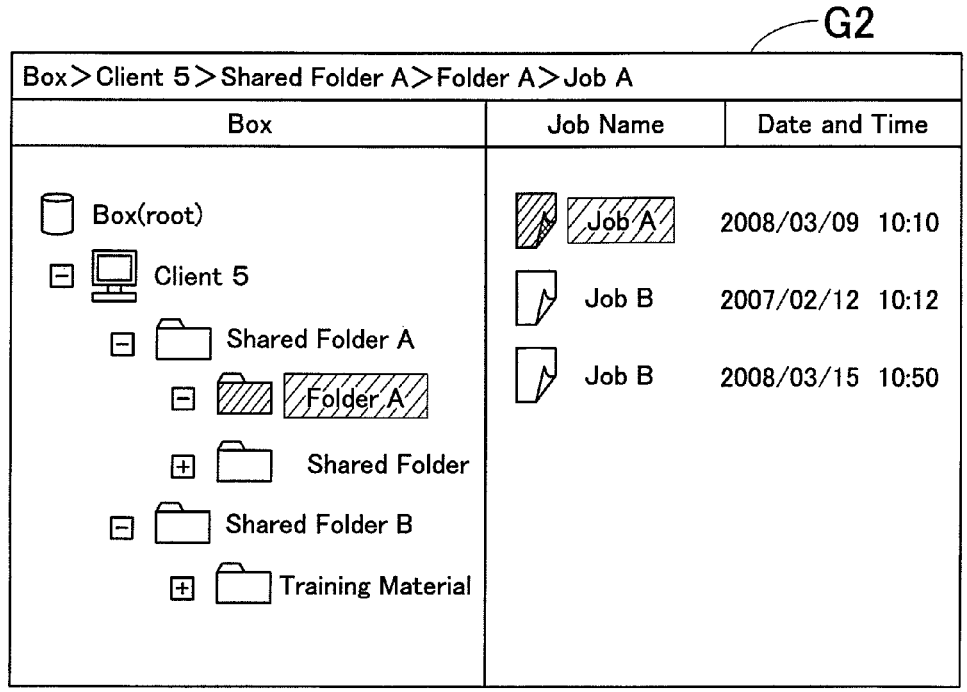
FIG. 10 is a view showing an example of a display screen in which jobs are shown in folder tree.
FIG. 11 is a view showing an example of a job reuse screen.

FIG. 10 is a view showing a display screen G2 displayed on the display 25, in which jobs connected to a login user are shown in folder tree.

Since a user can find jobs registered in the image processing apparatus 2 in an efficient manner by checking the display screen G2, he/she selects a job to reuse among those by touching its item field. In an example of FIG. 10, a job A to be executed on base data stored in a shared folder titled as 'Folder A' that is created in a shared folder of the client 5, titled as 'Shared Folder A', is selected.

Back to FIG. 9, in the mage processing apparatus 2, it is judged in Step S305, whether or not a user selects a job. If a user selects a job (YES in Step S305), then in Step S306, the job determiner 35 of the image processing apparatus 2 activates its function, determining the job selected among a plurality of jobs recorded in the memory 13 and information pieces of the job is obtained.

And also in Step S306, the job controller 36 checks the job access authority information 19 of the login user. If the 'view' authority is given to the user (YES in Step S306), a job reuse screen including change keys is displayed on the display 25 in Step S307.

If a user does not select a job in Step S305 (NO in Step S305), or if the 'view' authority is not given to the user in Step S306 (NO in Step S306), the routine immediately terminates.

FIG. 11 is a view showing an example of the job reuse screen G3 that is displayed on the display 25 in Step S307.

In the job display screen G3, detail information of the job selected by the user and operation buttons are displayed. A job name change button B8 is used to change a job name. A number-of-sets change button B9 is used to change a number of sets to be issued by the job (a number of sets to be printed). A single/both-side button B10 is used to change between single-side and both-side printings. A detail setting button B11 is used to change other settings, for example change between monochrome and full-color printings and between enlargement and reduction printings.

There provided in the lower area of the job reuse screen G3, an execute button B7, a delete button B12 and an end button B13 that can be operated by users. If the user presses the execute button B7, the job is executed by the image processing apparatus 2 based on the changed job information. If the user presses the delete button B12, the job is deleted. If the user presses the end button B13, the routine immediately terminates and the screen is returned to the display screen G2 of FIG. 10.

The job reuse screen G3 of FIG. 11 is displayed if the user selects a print job to reuse. If the user selects a PC-FAX transmission job to reuse, a screen to change a destination for example, is displayed.

Back to FIG. 9, in Step S308, the job administrator 32 waits until the user presses any button while the job reuse screen G3 is displayed. If any of the change buttons B8 through B11 is pressed (change button in Step S309), the routine proceeds to Step S310, and wherein it is judged by the job controller 36, whether or not the 'edit' authority is given to the login user according to the job access authority information 19. If the 'edit' authority is given to the user (YES in Step S310), a job reset process is performed in Step S311, then the process routine goes back to Step S307. If the 'edit' authority is not given to the user (NO in Step S310), the routine directly goes back to Step S307.

If the user presses the execute button B7, it is judged by the job administrator 32, that it is an execute button (execute button in Step S309), the job is executed by the job executor 33 based on the changed job information, in Step S312. For example, if a PC-FAX transmission job is executed, FAX data is transmitted to a destination indicated by destination information, by the job executor 33, cooperatively working with the communication interface 29.

Meanwhile, if the user presses the end button B13 via the job reuse screen G3, it is judged by the job administrator 32, that it is an end button (end button in Step S309), the process routine immediately terminates.

Meanwhile, if the user presses the delete button B12 via the job reuse screen G3, it is judged by the job administrator 32, that it is a delete button (delete button in Step S309), then in Step S313, it is judged by the job controller 36, whether or not the 'delete' authority is given to the user according to the job access authority information 19. If the 'delete' authority is given to the user (YES in Step S313), a deletion process is performed in Step S314, then the process routine terminates. If the 'delete' authority is not given to the user (NO in Step S313), the process routine goes back to Step S307.

As described above, in this embodiment, since a job, the user information 16, the storage location information 17, the share user information 18 and the job access authority information 19 are recorded in the memory 13 with their connections, as long as the image processing apparatus 2 receives user information, storage location information and job access authority information via the network 6 together with a job, when a user tries to reuse the job by operating the image processing apparatus 2, his/her use of the job is properly controlled based on these information pieces.

[Second Embodiment]

Hereinafter, a second embodiment of the present invention will be explained.

In the first embodiment described above, the image processing apparatus 2 receives a PC-FAX transmission job. In the second embodiment to be described below, the image processing apparatus 2 having a PC-FAX transmission job in the memory 13, receives a FAX receipt job from a facsimile apparatus. Since hardware and functional configurations of the image processing system 1 and the image processing apparatus 2 employed in the second embodiment is the same as those in the first embodiment, explanation thereof will be omitted.

In the second embodiment, the image processing apparatus 2 receives a FAX receipt job via the network 6, and if sender information received together with the job and destination information of a PC-FAX transmission job recorded in the memory 13 are the same, then the FAX receipt job and the PC-FAX transmission job's storage location information 17, share user information 18 and job access authority information 19 are recorded with their connections.

Figure 12:
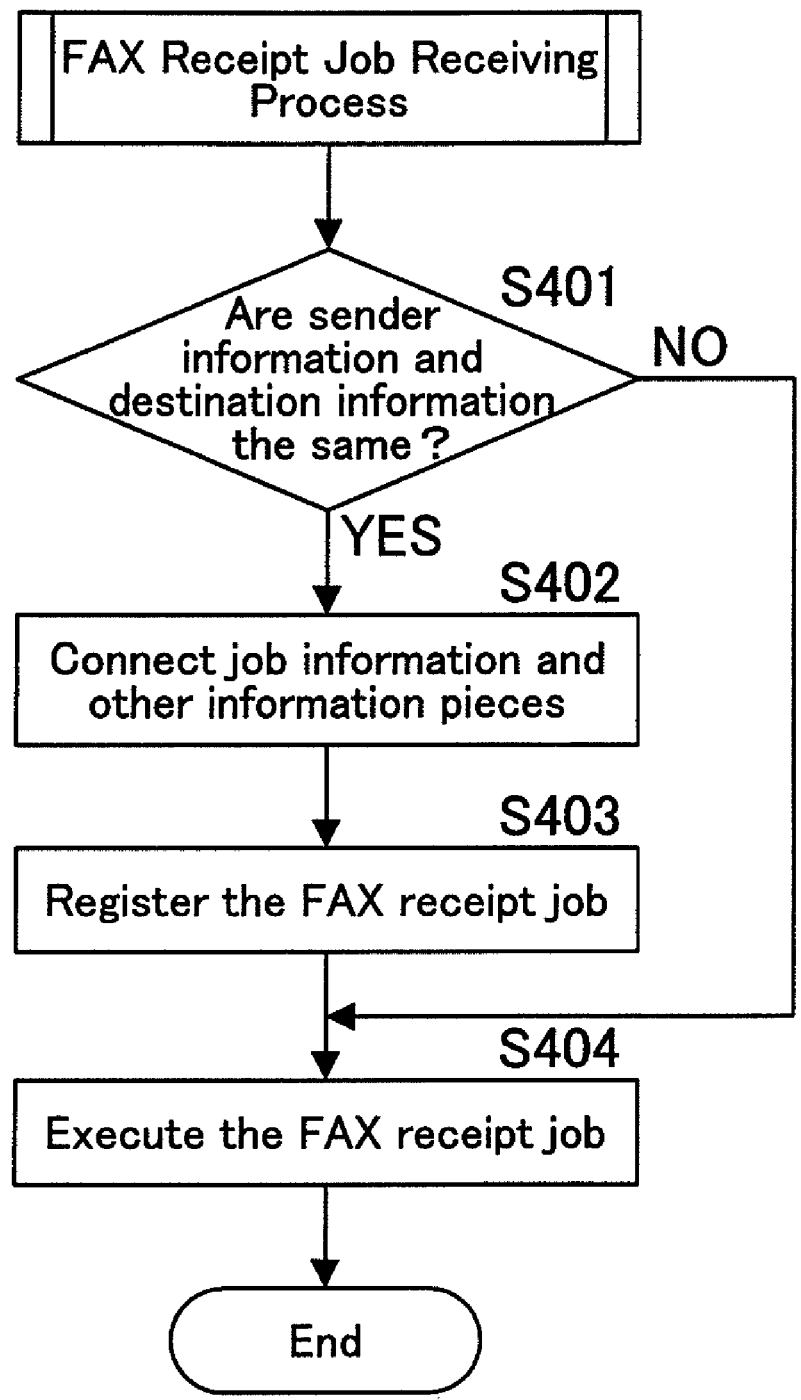
FIG. 12 is a flowchart representing a process routine to register a FAX receipt job, which is executed in the image processing apparatus according to another embodiment of the present invention.

FIG. 12 is a flowchart representing a process routine executed in the image processing apparatus 2 when a FAX receipt job is received. This process routine corresponds to a FAX receipt job receiving process (Step S209) of FIG. 7, previously mentioned in the first embodiment.

In Step S401, when the image processing apparatus 2 receives a FAX receipt job via the network 6, sender information received together with the job and destination information of PC-FAX transmission jobs included in the job information 14 recorded in the memory 13, are compared. If the sender information and destination information of any PC-FAX transmission job are the same (YES in Step S401), the FAX receipt job, the PC-FAX transmission job having the destination information that is the same as the sender information, and the PC-FAX transmission job's storage location information 17, share user information 18 and job access authority information 19 are connected in Step S402, and the FAX receipt job is registered in Step S403. Then in Step S404, the FAX receipt job is executed and received FAX data is printed out.

Meanwhile, in Step S401, if sender information received together with the FAX receipt job and destination information of any PC-FAX transmission jobs recorded in advance are not the same (NO in Step S401), the process routine proceeds to Step S404 without registration of the FAX receipt job, and wherein the FAX receipt job is executed.

As described above, in this embodiment, the image processing apparatus receives a FAX receipt job via the network 6, and if sender information received together with the job and destination information of a PC-FAX transmission job recorded in the memory 13 are the same, then the FAX receipt job, the PC-FAX transmission job and the PC-FAX transmission job's storage location information 17, share user information 18 and the job access authority information 19 are recorded with their connections. Thus, when a user using the client 4 tries to access the FAX receipt job recorded in the image processing apparatus 2, via the network 6, the access is prohibited as long as he/she is not included in those indicated by the share user information of the PC-FAX transmission job connected to the FAX receipt job. If the user is included in those indicated by the share user information, he/she is permitted to use the FAX receipt job at a user authority level defined by the job access authority information.

Some preferred embodiments of the present invention have been presented above. However, the present invention is not limited to these embodiments. For example, in these embodiments, a job to be reused mostly corresponds to a PC-FAX transmission job, but it does not limited to a PC-FAX transmission job. Specifically, in the first embodiment, even if a job to be reused corresponds to a print job, not a PC-FAX transmission job, the present invention can be applied to the embodiment While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. An image processing system comprising an image processing apparatus and an information processing apparatus interconnected via a network, and wherein:
   the information processing apparatus comprises:
   a memory that holds in itself, one or more than one shared folder storing one or more than one data piece;
   an accepter that accepts a user's specification of a data piece to be processed by a job among those stored in the shared folders and a user's request of the job to be executed on the specified data piece; and
   a transmitter that transmits the job to be executed on the specified data piece, share user information indicating users who are permitted to access the shared folder storing the specified data piece, and access permission information defining the users' user authority level to use the data piece, which is set for the shared folder, collectively to the image processing apparatus, and the image processing apparatus comprises:

a receiver that receives the job, the share user information and the access permission information;

a job access authority information generator that generates for the users, job access authority information indicating one of a plurality of user authority levels to perform operations on the job received by the receiver, based on the access permission information received together with the job;

a memory that records in itself, the job and the share user information received by the receiver and the job access authority information generated by the job access authority information generator, with their connections; and a controller that determines based on the users' user authority level indicated by the job access authority information, whether or not to permit operations on the job recorded in the memory, if any of the users gives an instruction to perform the operations on the job recorded in the memory.

2. The image processing system as recited in claim 1, wherein the job access authority information generator of the image processing apparatus generates the job access authority information by converting the access permission information thereto according to access authority conversion information.

3. The image processing system as recited in claim 1, wherein the access permission information indicates whether or not to permit accessing, editing, deleting, or re-executing the job recorded in the memory.

4. An image processing system comprising an image processing apparatus and an information processing apparatus interconnected via a network, and wherein:

the information processing apparatus comprises:

a memory that holds in itself, one or more than one shared folder storing one or more than one data piece;

an accepter that accepts a user's specification of a data piece to be processed by a job among those stored in the shared folders and a user's request of the job to be executed on the specified data piece; and a transmitter that transmits the job to be executed on the specified data piece, share user information indicating users who are permitted to access the shared folder storing the specified data piece, and access permission information defining the users' user authority level to use the data piece, which is set for the shared folder, collectively to the image processing apparatus;

the image processing apparatus comprises:

a receiver that receives the job, the share user information and the access permission information;

a job access authority information generator that generates job access authority information defining the users' user authority level to use the job received by the receiver, based on the access permission information received together with the job; and a memory that records in itself, the job and the share user information received by the receiver and the job access authority information generated by the job access authority information generator, with their connections;

the information processing apparatus further comprises a storage location information generator that generates storage location information indicating a storage location of the data piece;

the transmitter of the information processing apparatus further transmits storage location information generated by the storage location information generator, to the image processing apparatus together with the job;

the memory of the image processing apparatus further records the storage location information received by the receiver together with the job, with connections to the job; and the image processing apparatus further comprises:

an authenticator that performs authentication of a user who tries to log in;

an extractor that extracts a job connected to the user authenticated by the authenticator, among the plurality of jobs recorded in the memory, based on the share user information therein recorded with connection to the job; and a display that displays on itself, the extracted job in folder tree according to the storage location information.

5. The image processing system as recited in claim 4, wherein:

the memory of the image processing apparatus further records date and time information indicating the date and time the job is received; and the display of the image processing apparatus displays the extracted job together with the date and time information.

6. An image processing system comprising an image processing apparatus and an information processing apparatus interconnected via a network, and wherein:

the information processing apparatus comprises:

a memory that holds in itself, one or more than one shared folder storing one or more than one data piece;

an accepter that accepts a user's specification of a data piece to be processed by a job among those stored in the shared folders and a user's request of the job to be executed on the specified data piece; and a transmitter that transmits the job to be executed on the specified data piece, share user information indicating users who are permitted to access the shared folder storing the specified data piece, and access permission information defining the users' user authority level to use the data piece, which is set for the shared folder, collectively to the image processing apparatus;

the image processing apparatus comprises:

a receiver that receives the job, the share user information and the access permission information;

a job access authority information generator that generates job access authority information defining the users' user authority level to use the job received by the receiver, based on the access permission information received together with the job; and a memory that records in itself, the job and the share user information received by the receiver and the job access authority information generated by the job access authority information generator, with their connections; and if the job recorded in the memory of the image processing apparatus is a facsimile transmission instructing job to make the image processing apparatus to transmit facsimile data to a certain destination address while sender information of a facsimile job received by the receiver is identical with the destination address to which the facsimile data is to be transmitted, then the memory of the image processing apparatus further records the received facsimile job, the facsimile transmission instructing job, user information of the facsimile transmission instructing job, and the job access authority information, with their connections.

7. An image processing method implemented by an image processing system in which an image processing apparatus and an information processing apparatus holding one or more than one shared folder storing one or more than one data piece, are interconnected via a network, comprising:
the information processing apparatus accepting a user's specification of a data piece to be processed by a job among those stored in the shared folders and a user's request of the job to be executed on the specified data piece;
the information processing apparatus transmitting the job to be executed on the specified data piece, share user information indicating users who are permitted to access the shared folder storing the specified data piece, and access permission information defining the users' user authority level to use the data piece, which is set for the shared folder, collectively to the image processing apparatus;
the image processing apparatus receiving the job, the share user information and the access permission information;
the image processing apparatus generating for the users, job access authority information indicating one of plurality of user authority levels to perform operations on the received job, based on the access permission information received together with the job;
the image processing apparatus recording in a memory, the received job and share user information and the generated job access authority information, with their connections; and
the image processing apparatus determining based on the users' user authority level whether or not to permit operations on the job recorded in the memory, if any of the users gives an instruction to perform the operations on the job recorded in the memory.

8. The image processing method recited in claim 7, wherein the job access authority information is generated by converting the access permission information thereto according to access authority conversion information.

9. The image processing method as recited in claim 7, wherein the access permission information indicates whether or not to permit accessing, editing, deleting, or re-executing the job recorded in the memory.

10. An image processing method implemented by an image processing system in which an image processing apparatus holding one or more than one shared folder storing one or more than one data piece, are interconnected via a network, comprising:
the information processing apparatus accepting a user's specification of a data piece to be processed by a job among those stored in the shared folders and a user's request of the job to be executed on the specified data piece;
the information processing apparatus transmitting the job to be executed on the specified data piece, share user information indicating users who are permitted to access the shared folder storing the specified data piece, and access permission information defining the users' user authority level to use the data piece, which is set for the shared folder, collectively to the image processing apparatus;
the image processing apparatus receiving the job, the share user information and the access permission information;
the image processing apparatus generating job access authority information defining the users' user authority level to use the received job, based on the access permission information received together with the job; and
the image processing apparatus recording in a memory, the received job and share user information and the generated job access authority information, with their connections, wherein:
the information processing apparatus further executes generating storage location information indicating a storage location of the data piece;
the information processing apparatus further transmits the generated storage location information to the image processing apparatus together with the job;
the image processing apparatus further records in the memory, the storage location information received from the information processing apparatus, with connections to the job; and
the image processing apparatus further executes:
performing authentication of a user who tries to log in;
extracting a job connected to the authenticated user among the plurality of recorded jobs, based on the share user information recorded with connections to the job; and
displaying on a display, the extracted job in folder tree according to the storage location information.

11. The image processing method recited in claim 10, wherein:
date and time information indicating the date and time the job is received is further recorded in the memory of the image processing apparatus; and
the extracted job is displayed together with the date and time information on the display of the image processing apparatus.

12. An image processing method implemented by an image processing system in which an image processing apparatus and an information processing apparatus holding one or more than one shared folder storing one or more than one data piece, are interconnected via a network, comprising:
the information processing apparatus accepting a user's specification of a data piece to be processed by a job among those stored in the shared folders and a user's request of the job to be executed on the specified data piece;
the information processing apparatus transmitting the job to be executed on the specified data piece, share user information indicating users who are permitted to access the shared folder storing the specified data piece, and access permission information defining the users' user authority level to use the data piece, which is set for the shared folder, collectively to the image processing apparatus;
the image processing apparatus receiving the job, the share user information and the access permission information;
the image processing apparatus generating job access authority information defining the users' user authority level to use the received job, based on the access permission information received together with the job; and
the image processing apparatus recording in a memory, the received job and share user information and the generated job access authority information, with their connections,
wherein if the job recorded in the memory of the image processing apparatus is a facsimile transmission instructing job to make the image processing apparatus to transmit facsimile data to a certain destination address while sender information of a received facsimile receipt job is identical with the destination address to which the facsimile data is to be transmitted, then the received facsimile job, the facsimile transmission instructing job, user information of the facsimile transmission instructing job, and the job access authority information are recorded in the memory of the image processing apparatus, with their connections.

13. An image processing apparatus comprising:
a receiver that receives via a network, collectively from an information processing apparatus holding one or more than one shared folder storing one or more than one data piece, a job, share user information indicating users who are permitted to access the shared folder storing a data piece to be processed by the job, and access permission information defining the users' user authority level to use the data piece, which is set for the shared folder;
a job access authority information generator that generates for the users, job access authority information indicating one of a plurality of user authority levels to perform operations on the job received by the receiver, based on the access permission information received together with the job;
a memory that records in itself, the job and the share user information received by the receiver and the job access authority information generated by the job access authority information generator, with their connections; and
a controller that determines based on the users' user authority level indicated by the job access authority information, whether or not to permit operations on the job recorded in the memory, if any of the users gives an instruction to perform the operations on the job recorded in the memory.

14. The image processing apparatus as recited in claim 13, wherein the job access authority information generator generates the job access authority information by converting the access permission information thereto according to access authority conversion information.

15. The image processing apparatus recited in claim 13, wherein the access permission information indicates whether or not to permit accessing, editing deleting or re-executing the job recorded in the memory.

16. The image processing apparatus comprising:
a receiver that receives via a network, collectively from an information processing apparatus holding one or more than one shared folder storing one or more than one data piece, a job, share user information indicating users who are permitted to access the shared folder storing a data piece to be processed by the job, and access permission information defining the users' user authority level to use the data piece, which is set for the shared folder;
a job access authority information generator that generates job access authority information defining the users' user authority level to use the job received by the receiver, based on the access permission information received together with the job; and
a memory that records in itself, the job and the share user information received by the receiver and the job access authority information generated by the job access authority information generator, with their connections, wherein:
the receiver further receives storage location information indicating a storage location of the data piece, which are transmitted together with the job;
the memory further records the storage location information received by the receiver together with the job, with connections to the job, and
the image processing apparatus further comprises:
an authenticator that performs authentication of a user who tries to log in;
an extractor that extracts a job connected to the user authenticated by the authenticator, among the plurality of jobs recorded in the memory, based on the share user information therein recorded with connection to the job; and
a display that displays on itself, the extracted job in folder tree according to the storage location information.

17. The image processing apparatus recited in claim 16, wherein:
the memory further records date and time information indicating a date and time the job is received; and
the display displays the extracted job together with the date and time information.

18. An image processing apparatus comprising:
a receiver that receives via a network, collectively from an information processing apparatus holding one or more than one shared folder storing one or more than one data piece, a job, share user information indicating users who are permitted to access the shared folder storing a data piece to be processed by the job, and access permission information defining the users' user authority level to use the data piece, which is set for the shared folder;
a job access authority information generator that generates job access authority information defining the users' user authority level to use the job received by the receiver, based on the access permission information received together with the job; and
a memory that records in itself, the job and the share user information received by the receiver and the job access authority information generated by the job access authority information generator, with their connections, wherein
if the job recorded in the memory is a facsimile transmission instructing job to make the image processing apparatus to transmit facsimile data to a certain destination address while sender information of a facsimile job received by the receiver is identical with the destination address to which the facsimile data is to be transmitted, then the memory further records in the memory, the received facsimile job, the facsimile transmission instructing job, user information of the facsimile transmission instructing job, and the job access authority information, with their connections.

19. An image processing program recorded in a non-transitory computer readable recording medium to make a computer of an image processing apparatus execute:
receiving via a network, collectively from an information processing apparatus holding one or more than one shared folder storing one or more than one data piece, a job, share user information indicating users who are permitted to access the shared folder storing a data piece to be processed by the job, and access permission information defining the users' user authority level to use the data piece, which is set for the shared folder;
generating for the users, job access authority information indicating one of a plurality of user authority levels to perform operations on the job, based on the access permission information received together with the job;
recording in a memory, the received job and share user information, and the generated job access authority information, with their connections; and
determining based on the users' user authority level indicated by the job access authority information, whether or not to permit operations on the job recorded in the memory, if any of the users gives an instruction to perform the operations on the job recorded in the memory.

20. The image processing program as recited in claim 19, further making the computer execute generating the job access authority information by converting the access permission information according to access authority conversion information.

21. The image processing program as recited in claim 19, wherein the access permission information indicates whether or not to permit accessing, editing, deleting, or re-executing the job recorded in the memory.

22. An image processing program recorded in a non-transitory computer readable recording medium to make a computer of an image processing apparatus execute:

receiving via a network, collectively from an information processing apparatus holding one or more than one shared folder storing one or more than one data piece, a job, share user information indicating users who are permitted to access the shared folder storing a data piece to be processed by the job, and access permission information defining the users' user authority level to use the data piece, which is set for the shared folder;

generating job access authority information defining the users' user authority level to use the job, based on the access permission information received together with the job;

recording in a memory, the received job and share user information, and the generated job access authority information, with their connections, wherein:

storage location information indicating a storage location of the data piece, which are transmitted together with the job is further received;

the received storage location information is further recorded in the memory with connections to the job, and the computer is further allowed to execute:

performing authentication of a user who tries to log in;

extracting a job connected to the authenticated by the authenticator, among the plurality of jobs recorded in the memory, based on the share user information therein recorded with connection to the job; and displaying on a display, the extracted job in folder tree according to the storage location information.

23. The image processing program as recited in claim 22, wherein:

date and time information indicating the date and time the job is received is further recorded in the memory; and the extracted job is displayed together with the date and time information on the display.

24. An image processing program recorded in a non-transitory computer readable recording medium to make a computer of an image processing apparatus execute:

receiving via a network, collectively from an information processing apparatus holding one or more than one shared folder storing one or more than one data piece, a job, share user information indicating users who are permitted to access the shared folder storing a data piece to be processed by the job, and access permission information defining the users' user authority level to use the data piece, which is set for the shared folder;

generating job access authority information defining the users' user authority level to use the job, based on the access permission information received together with the job;

recording in a memory, the received job and share user information, and the generated job access authority information, with their connections, wherein if the job recorded in the memory is a facsimile transmission instructing job to make the image processing apparatus to transmit facsimile data to a certain destination address while sender information of a facsimile job received by the receiver is identical with the destination address to which the facsimile data is to be transmitted, then the received facsimile job, the facsimile transmission instructing job, user information of the facsimile transmission instructing job, and the job access authority information are further recorded in the memory, with their connections.

\* \* \* \* \*